United States Patent
Xu et al.

(10) Patent No.: US 10,674,453 B2
(45) Date of Patent: Jun. 2, 2020

(54) POWER CONTROL MANAGEMENT IN UPLINK (UL) COORDINATED MULTIPOINT (COMP) TRANSMISSION

(71) Applicant: QUALCOMM Incorporated, San Diego, CA (US)

(72) Inventors: Hao Xu, San Diego, CA (US); Peter Gaal, San Diego, CA (US); Wanshi Chen, San Diego, CA (US); Stefan Geirhofer, San Diego, CA (US); Madhavan Srinivasan Vajapeyam, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/643,852

(22) Filed: Jul. 7, 2017

(65) Prior Publication Data

US 2018/0027500 A1 Jan. 25, 2018

Related U.S. Application Data

(62) Division of application No. 13/752,856, filed on Jan. 29, 2013, now Pat. No. 9,730,164.
(Continued)

(51) Int. Cl.
*H04W 52/14* (2009.01)
*H04W 52/24* (2009.01)
(Continued)

(52) U.S. Cl.
CPC .......... *H04W 52/146* (2013.01); *H04B 7/024* (2013.01); *H04L 5/0048* (2013.01);
(Continued)

(58) Field of Classification Search
CPC ..... H04B 7/024; H04L 5/0048; H04L 5/0073; H04W 52/08; H04W 52/10; H04W 52/146; H04W 52/242; H04W 74/0833
See application file for complete search history.

(56) References Cited

U.S. PATENT DOCUMENTS

| 6,862,457 B1 * | 3/2005 | Sarkar | G01S 11/02 455/226.1 |
| 7,164,660 B2 | 1/2007 | Baker et al. | |

(Continued)

FOREIGN PATENT DOCUMENTS

| CN | 101132203 A | 2/2008 |
| CN | 101945409 A | 1/2011 |

(Continued)

OTHER PUBLICATIONS

NTT DOCOMO, 3GPP TSG RAN WG1 Meeting #66, "Views on UL power control for HetNet scenario" Aug. 2011, all pages.*
(Continued)

*Primary Examiner* — Gregory B Sefcheck
*Assistant Examiner* — Srinivasa R Reddivalam
(74) *Attorney, Agent, or Firm* — Linda G. Gunderson; Patterson & Sheridan LLP

(57) ABSTRACT

Techniques for performing path loss (PL) compensation in coordinated multipoint (CoMP) systems are provided. A method for wireless communications by a user equipment (UE) is provided. The method generally includes selecting, from a plurality of transmission points involved in uplink (UL) coordinated multipoint (CoMP) operations with the UE, a transmission point to associate with for path loss (PL) compensation, and adjusting power of one or more transmissions based on path loss measured based on the selected transmission point.

6 Claims, 16 Drawing Sheets

Related U.S. Application Data

(60) Provisional application No. 61/592,427, filed on Jan. 30, 2012.

(51) Int. Cl.

| | |
|---|---|
| *H04L 5/00* | (2006.01) |
| *H04W 52/28* | (2009.01) |
| *H04W 52/54* | (2009.01) |
| *H04W 52/08* | (2009.01) |
| *H04W 52/10* | (2009.01) |
| *H04W 52/36* | (2009.01) |
| *H04W 52/50* | (2009.01) |
| *H04W 52/32* | (2009.01) |
| *H04W 52/46* | (2009.01) |
| *H04B 7/024* | (2017.01) |
| *H04W 74/08* | (2009.01) |

(52) U.S. Cl.
CPC .......... *H04L 5/0073* (2013.01); *H04W 52/08* (2013.01); *H04W 52/10* (2013.01); *H04W 52/242* (2013.01); *H04W 52/244* (2013.01); *H04W 52/246* (2013.01); *H04W 52/248* (2013.01); *H04W 52/282* (2013.01); *H04W 52/325* (2013.01); *H04W 52/362* (2013.01); *H04W 52/46* (2013.01); *H04W 52/50* (2013.01); *H04W 52/54* (2013.01); *H04L 5/0035* (2013.01); *H04W 74/0833* (2013.01)

(56) References Cited

U.S. PATENT DOCUMENTS

| | | | |
|---|---|---|---|
| 7,372,898 B2 | 5/2008 | Shin et al. | |
| 7,899,486 B2 | 3/2011 | You et al. | |
| 8,274,952 B2 | 9/2012 | Jard et al. | |
| 2006/0035660 A1* | 2/2006 | Anderson | H04W 52/06 455/522 |
| 2006/0040619 A1* | 2/2006 | Cho | H04W 52/08 455/69 |
| 2007/0082620 A1 | 4/2007 | Zhang et al. | |
| 2007/0149201 A1 | 6/2007 | Dominique et al. | |
| 2008/0207247 A1* | 8/2008 | Gholmieh | H04W 52/56 455/522 |
| 2009/0170437 A1 | 7/2009 | Bhattad et al. | |
| 2010/0197339 A1 | 8/2010 | Pedersen et al. | |
| 2011/0164659 A1* | 7/2011 | Kawamura | H04B 1/713 375/133 |
| 2011/0171992 A1 | 7/2011 | Seo et al. | |
| 2011/0222416 A1 | 9/2011 | Damnjanovic et al. | |
| 2011/0250919 A1 | 10/2011 | Barbieri et al. | |
| 2012/0034926 A1 | 2/2012 | Damnjanovic et al. | |
| 2012/0238305 A1 | 9/2012 | Xiao et al. | |
| 2012/0322493 A1* | 12/2012 | Nikopour | H04W 52/146 455/522 |
| 2013/0029657 A1 | 1/2013 | Gao et al. | |
| 2013/0114569 A1* | 5/2013 | Anderson | H04W 52/06 370/335 |
| 2013/0194953 A1 | 8/2013 | Xu et al. | |
| 2013/0242951 A1 | 9/2013 | Lee et al. | |
| 2014/0105042 A1 | 4/2014 | Cui et al. | |
| 2014/0126479 A1 | 5/2014 | Iwai et al. | |
| 2014/0342768 A1* | 11/2014 | Soldati | H04B 7/024 455/522 |
| 2015/0304960 A1* | 10/2015 | Yang | H04B 15/00 370/252 |

FOREIGN PATENT DOCUMENTS

| | | |
|---|---|---|
| CN | 102076062 A | 5/2011 |
| EP | 1628413 | 2/2006 |
| WO | WO-2001099303 | 12/2001 |
| WO | WO-2010120219 A1 | 10/2010 |
| WO | WO-2011103476 A1 | 8/2011 |
| WO | WO-2011159207 A1 | 12/2011 |

OTHER PUBLICATIONS

Alcatel-Lucent Shanghai Bell et al: "PUSCH power control for uplink CaMP", 3GPP Draft; R1-114053_Power Control for PUSCH_Clean, 3rd Generation Partnership Project (3GPP), Mobile Competence Centre; 650, Route Des Lucioles; F-06921 Sophia-Antipolis Cedex; France, vol. RAN WG1, No. San Francisco, USA; Nov. 11, 2011-Nov. 8, 2011, Nov. 8, 2011 (Nov. 8, 2011), XP050562218, [retrieved on Nov. 8, 2011].

Gatt: "Uplink power control discussions for CaMP", 3GPP Draft; R1-112964, 3rd Generation Partnership Project (3GPP), Mobile Competence Centre; 650, Route Des Lucioles; F-06921 Sophia-Antipolis Cedex; France, vol. RAN WG1, No. Zhuhai; Oct. 10, 2011, Oct. 4, 2011 (Oct. 4, 2011), XP050538170, [retrieved on Oct. 4, 2011].

Intel Corporation: "Uplink Power Control Discussion for CoMP Scenario 4", 3GPP Draft; R1-112228, 3rd Generation Partnership Project (3GPP), Mobile Competence Centre ; 650, Route Des Lucioles ; F-06921 Sophia-Antipolis Cedex ; France, vol. Ran WG1, No. Athens, Greece; Aug. 22, 2011, Aug. 16, 2011 (Aug. 16, 2011), XP050537390, [retrieved on Aug. 16, 2011].

International Search Report and Written Opinion—PCT/US2013/023745—ISA/EPO—dated Jun. 21, 2013.

Kyocera: "Range Expansion Performance and Interference Management for Control Channels in Outdoor Hotzone Scenario", 3GPP Draft; R1-102363 RE CCH_OUTHOT, 3rd Generation Partnership Project (3GPP), Mobile Competence Centre ; 650, Route Des Lucioles ; F-06921 Sophia-Antipolis Cedex ; France, vol. RAN WGI, No. Beijing, china; Apr. 12, 2010, Apr. 6, 2010 (Apr. 6, 2010), XP050419587, [retrieved on Apr. 6, 2010].

Kyocera: "Uplink performance evaluation in heterogeneous deployment configurations 3 and 4", 3GPP Draft; R1-093855 UL EVAL HET CONFIG3 4, 3rd Generation Partnership Project (3GPP), Mobile Competence Centre ; 650, Route Des Lucioles ; F- 06921 Sophia Antipolis Cedex; France, No. Miyazaki; Oct. 12, 2009, Oct. 12, 2009 (Oct. 12, 2009), XP050388361, [retrieved on Oct. 5, 2009] the whole document.

Partial International Search Report—PCT/US2013/023745—ISA/EPO—dated Mar. 21, 2013.

Qualcomm Incorporated: "Importance of Serving Cell Selection in Heterogeneous Networks", 3GPP Draft; R1-100701 Importance of Serving Cell Association in Heterogeneous Networks, 3rd Generation Partnership Project (3GPP), Mobile Competence Centre ; 650, Route Des Lucioles ; F-06921 Sophia-Antipolis Cedex ; France, vol. RAN WG1, No. Valencia, Spain; Jan. 18, 2010-Jan. 22, 2010, Jan. 12, 2010 (Jan. 12, 2010), XP050597974, [retrieved on Jan. 12, 2010] the whole document.

Qualcomm Incorporated: "Phase 2 evaluation results for HetNet CoMP scenarios", 3GPP Draft; R1-112544 Phase 2 Evaluation, 3rd Generation Partnership Project (3GPP), Mobile Competence Centre; 650, Route Des Lucioles; F-06921 Sophia-Antipolis Cedex; France, vol. RAN WG1, No. Athens, Greece; Aug. 22, 2011,Aug. 16, 2011 (Aug. 16, 2011), XP050537621, [Retrieved on Aug. 16, 2011].

\* cited by examiner

Table 1 SRPI of Macro eNB

| Index | 0 | 1 | 2 | 3 | 4 | 5 | 6 | 7 |
|---|---|---|---|---|---|---|---|---|
| SRPI value | X | X | X | U | X | X | X | N |

Table 2 SRPI of Femto eNB

| Index | 0 | 1 | 2 | 3 | 4 | 5 | 6 | 7 |
|---|---|---|---|---|---|---|---|---|
| SRPI value | X | X | X | N | X | X | X | U |

POWER CONTROL MANAGEMENT IN UPLINK (UL) COORDINATED MULTIPOINT (COMP) TRANSMISSION

CLAIM OF PRIORITY UNDER 35 U.S.C. § 119

This application is a divisional of U.S. patent application Ser. No. 13/752,856, filed Jan. 29, 2013, which claims the benefit of U.S. Provisional Patent Application No. 61/592,427, filed Jan. 30, 2012, both of which are herein incorporated by reference in their entirety.

BACKGROUND

I. Field

Certain aspects of the disclosure generally relate to wireless communications and, more particularly, to techniques for managing power control in uplink coordinated multipoint (CoMP) transmissions.

II. Background

Wireless communication networks are widely deployed to provide various communication services such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks and Single-Carrier FDMA (SC-FDMA) networks.

A wireless communication network may include a number of base stations that can support communication for a number of user equipments (UEs). A UE may communicate with a base station via the downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may observe interference due to transmissions from neighbor base stations. On the uplink, a transmission from the UE may cause interference to transmissions from other UEs communicating with the neighbor base stations. The interference may degrade performance on both the downlink and uplink.

SUMMARY

Certain aspects of the present disclosure provide techniques, corresponding apparatus, and program products, for path loss compensation in a coordinated multipoint (CoMP) system.

Certain aspects provide a method for wireless communications by a user equipment (UE) to compensate for differences in path loss. The method generally includes selecting, from a plurality of transmission points involved in uplink (UL) coordinated multipoint (CoMP) operations with the UE, a transmission point to associate with for path loss (PL) compensation and adjusting power of one or more transmissions based on path loss measured based on the selected transmission point.

Certain aspects provide a method for wireless communications by a base station (e.g., eNB or other type transmission point) to compensate for path loss. The method generally includes utilizing a first power control algorithm to adjust transmit power of a first contention-based random access channel (RACH) transmitted from a UE and utilizing a second power control algorithm to adjust transmit power of a non contention-based RACH.

Certain aspects provide a method for wireless communications by a user equipment (UE) to compensate for differences in path loss. The method generally includes utilizing a first power control algorithm to adjust transmit power of a first contention-based random access channel (RACH) to a base station and utilizing a second power control algorithm to adjust transmit power of a non contention-based RACH.

Certain aspects provide a method for wireless communications by a base station to compensate for path loss. The method generally includes determining mobility of a UE and selecting a power control algorithm for use in controlling power of transmissions from the UE, based on the determined mobility.

Certain aspects provide a method for wireless communications by a user equipment (UE) to compensate for path loss. The method generally includes measuring path loss (PL) for a plurality of transmission points involved in uplink (UL) coordinate multipoint (CoMP) transmissions with the UE and selecting, based on the PL measurements, one of the transmission points for applying PL compensation.

Certain aspects provide a method for wireless communications by a base station to compensate for path loss. The method generally includes measuring path loss (PL) between a user equipment (UE) and one or more transmission points involved in uplink (UL) coordinate multipoint (CoMP) transmissions with the UE and taking action to compensate for the measured path loss.

Certain aspects provide a method for wireless communications by a user equipment (UE) to compensate for path loss. The method generally includes measuring both common reference signals (CRS) and channel state information reference signals (CSI-RS) transmitted from transmission points involved in uplink (UL) CoMP transmissions and performing power control for UL transmissions based on both the CRS and the CSI-RS.

Various aspects and features of the disclosure are described in further detail below.

BRIEF DESCRIPTION OF THE DRAWINGS

FIG. 5 illustrates example resource partitioning in a heterogeneous network, in accordance with certain aspects of the present disclosure.

DETAILED DESCRIPTION

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, certain aspects of the techniques are described below for LTE, and LTE terminology is used in much of the description below.

Example Wireless Network

Figure 1:
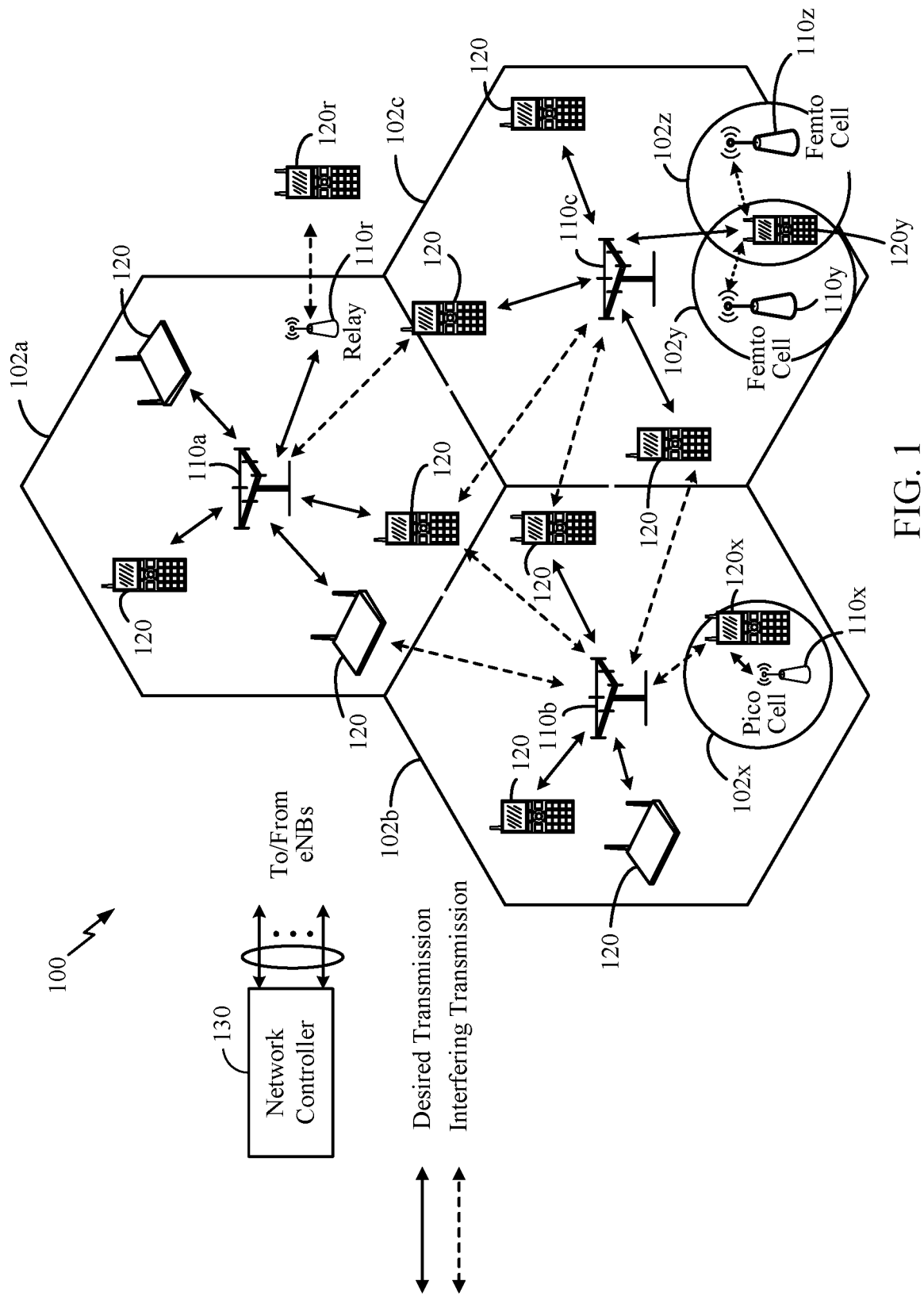
FIG. 1 is a block diagram conceptually illustrating an example of a wireless communications network, in accordance with certain aspects of the present disclosure.

FIG. 1 shows a wireless communication network 100, which may be an LTE network. The wireless network 100 may include a number of evolved Node Bs (eNBs) 110 and other network entities. An eNB may be a station that communicates with user equipment devices (UEs) and may also be referred to as a base station, a Node B, an access point, etc. Each eNB 110 may provide communication coverage for a particular geographic area. In 3GPP, the term "cell" can refer to a coverage area of an eNB and/or an eNB subsystem serving this coverage area, depending on the context in which the term is used.

An eNB may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). An eNB for a macro cell may be referred to as a macro eNB (i.e., a macro base station). An eNB for a pico cell may be referred to as a pico eNB (i.e., a pico base station). An eNB for a femto cell may be referred to as a femto eNB (i.e., a femto base station) or a home eNB. In the example shown in FIG. 1, eNBs 110*a*, 110*b*, and 110*c* may be macro eNBs for macro cells 102*a*, 102*b*, and 102*c*, respectively. eNB 110*x* may be a pico eNB for a pico cell 102*x*. eNBs 110*y* and 110*z* may be femto eNBs for femto cells 102*y* and 102*z*, respectively. An eNB may support one or multiple (e.g., three) cells.

The wireless network 100 may also include relay stations. A relay station is a station that receives a transmission of data and/or other information from an upstream station (e.g., an eNB or a UE) and sends a transmission of the data and/or other information to a downstream station (e.g., a UE or an eNB). A relay station may also be a UE that relays transmissions for other UEs. In the example shown in FIG. 1, a relay station 110*r* may communicate with eNB 110*a* and a UE 120*r* in order to facilitate communication between eNB 110*a* and UE 120*r*. A relay station may also be referred to as a relay eNB, a relay, etc.

The wireless network 100 may be a heterogeneous network (HetNet) that includes eNBs of different types, e.g., macro eNBs, pico eNBs, femto eNBs, relays, etc. These different types of eNBs may have different transmit power levels, different coverage areas, and different impact on interference in the wireless network 100. For example, macro eNBs may have a high transmit power level (e.g., 20 watts) whereas pico eNBs, femto eNBs, and relays may have a lower transmit power level (e.g., 1 watt).

The wireless network 100 may support synchronous or asynchronous operation. For synchronous operation, the eNBs may have similar frame timing, and transmissions from different eNBs may be approximately aligned in time. For asynchronous operation, the eNBs may have different frame timing, and transmissions from different eNBs may not be aligned in time. The techniques described herein may be used for both synchronous and asynchronous operation.

A network controller 130 may couple to a set of eNBs and provide coordination and control for these eNBs. The network controller 130 may communicate with eNBs 110 via a backhaul. The eNBs 110 may also communicate with one another, e.g., directly or indirectly via wireless or wireline backhaul.

The UEs 120 may be dispersed throughout the wireless network 100, and each UE may be stationary or mobile. A UE may also be referred to as a terminal, a mobile station, a subscriber unit, a station, etc. A UE may be a cellular phone, a personal digital assistant (PDA), a wireless modem, a wireless communication device, a handheld device, a laptop computer, a cordless phone, a wireless local loop (WLL) station, a tablet, etc. A UE may be able to communicate with macro eNBs, pico eNBs, femto eNBs, relays, etc. In FIG. 1, a solid line with double arrows indicates desired transmissions between a UE and a serving eNB, which is an eNB designated to serve the UE on the downlink and/or uplink. A dashed line with double arrows indicates interfering transmissions between a UE and an eNB. For certain aspects, the UE may comprise an LTE Release 10 UE.

LTE utilizes orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, K may be equal to 128, 256, 512, 1024, or 2048 for system bandwidth of 1.25, 2.5, 5, 10, or 20 megahertz (MHz), respectively. The system bandwidth may also be partitioned into subbands. For example, a subband may cover 1.08 MHz, and there may be 1, 2, 4, 8, or 16 subbands for system bandwidth of 1.25, 2.5, 5, 10, or 20 MHz, respectively.

Figure 2:
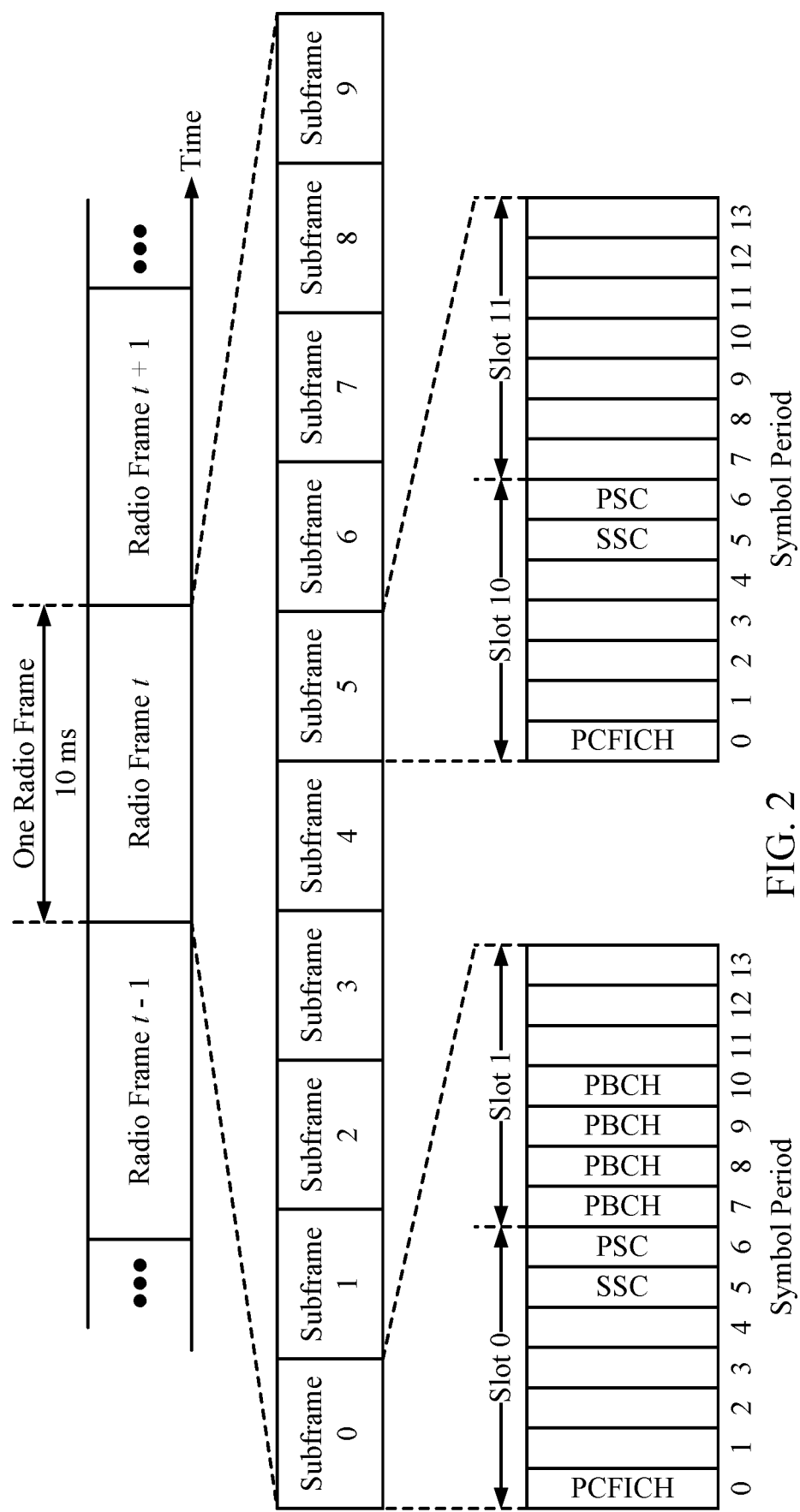
FIG. 2 is a block diagram conceptually illustrating an example of a frame structure in a wireless communications network, in accordance with certain aspects of the present disclosure.

FIG. 2 shows a frame structure used in LTE. The transmission timeline for the downlink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., L=7 symbol periods for a normal cyclic prefix (as shown in FIG. 2) or L=6 symbol periods for an extended cyclic prefix. The 2L symbol periods in each subframe may be assigned indices of 0 through 2L−1. The available time frequency resources may be partitioned into resource blocks. Each resource block may cover N subcarriers (e.g., 12 subcarriers) in one slot.

In LTE, an eNB (e.g., eNB 110) may send a primary synchronization signal (PSS) and a secondary synchronization signal (SSS) for each cell (e.g., cell 102) in the eNB. The primary and secondary synchronization signals may be sent in symbol periods 6 and 5, respectively, in each of subframes 0 and 5 of each radio frame with the normal cyclic prefix, as shown in FIG. 2. The synchronization signals may be used by UEs (e.g., UEs 120) for cell detection and acquisition. The eNB may send a Physical Broadcast Channel (PBCH) in symbol periods 0 to 3 in slot 1 of subframe 0. The PBCH may carry certain system information.

The eNB may send a Physical Control Format Indicator Channel (PCFICH) in the first symbol period of each subframe, as shown in FIG. 2. The PCFICH may convey the number of symbol periods (M) used for control channels, where M may be equal to 1, 2, or 3 and may change from subframe to subframe. M may also be equal to 4 for a small system bandwidth, e.g., with less than 10 resource blocks. The eNB may send a Physical HARQ Indicator Channel (PHICH) and a Physical Downlink Control Channel (PDCCH) in the first M symbol periods of each subframe (not shown in FIG. 2). The PHICH may carry information to support hybrid automatic repeat request (HARQ). The PDCCH may carry information on resource allocation for UEs and control information for downlink channels. The eNB may send a Physical Downlink Shared Channel (PDSCH) in the remaining symbol periods of each subframe. The PDSCH may carry data for UEs scheduled for data transmission on the downlink. The various signals and channels in LTE are described in 3GPP TS 36.211, entitled "Evolved Universal Terrestrial Radio Access (E-UTRA); Physical Channels and Modulation," which is publicly available.

The eNB may send the PSS, SSS, and PBCH in the center 1.08 MHz of the system bandwidth used by the eNB. The eNB may send the PCFICH and PHICH across the entire system bandwidth in each symbol period in which these channels are sent. The eNB may send the PDCCH to groups of UEs in certain portions of the system bandwidth. The eNB may send the PDSCH to specific UEs in specific portions of the system bandwidth. The eNB may send the PSS, SSS, PBCH, PCFICH, and PHICH in a broadcast manner to all UEs, may send the PDCCH in a unicast manner to specific UEs and may also send the PDSCH in a unicast manner to specific UEs.

A number of resource elements may be available in each symbol period. Each resource element may cover one subcarrier in one symbol period and may be used to send one modulation symbol, which may be a real or complex value. Resource elements not used for a reference signal in each symbol period may be arranged into resource element groups (REGs). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1, and 2. The PDCCH may occupy 9, 18, 32, or 64 REGs, which may be selected from the available REGs, in the first M symbol periods. Only certain combinations of REGs may be allowed for the PDCCH.

A UE may know the specific REGs used for the PHICH and the PCFICH. The UE may search different combinations of REGs for the PDCCH. The number of combinations to search is typically less than the number of allowed combinations for the PDCCH. An eNB may send the PDCCH to the UE in any of the combinations that the UE will search.

Figure 2A:
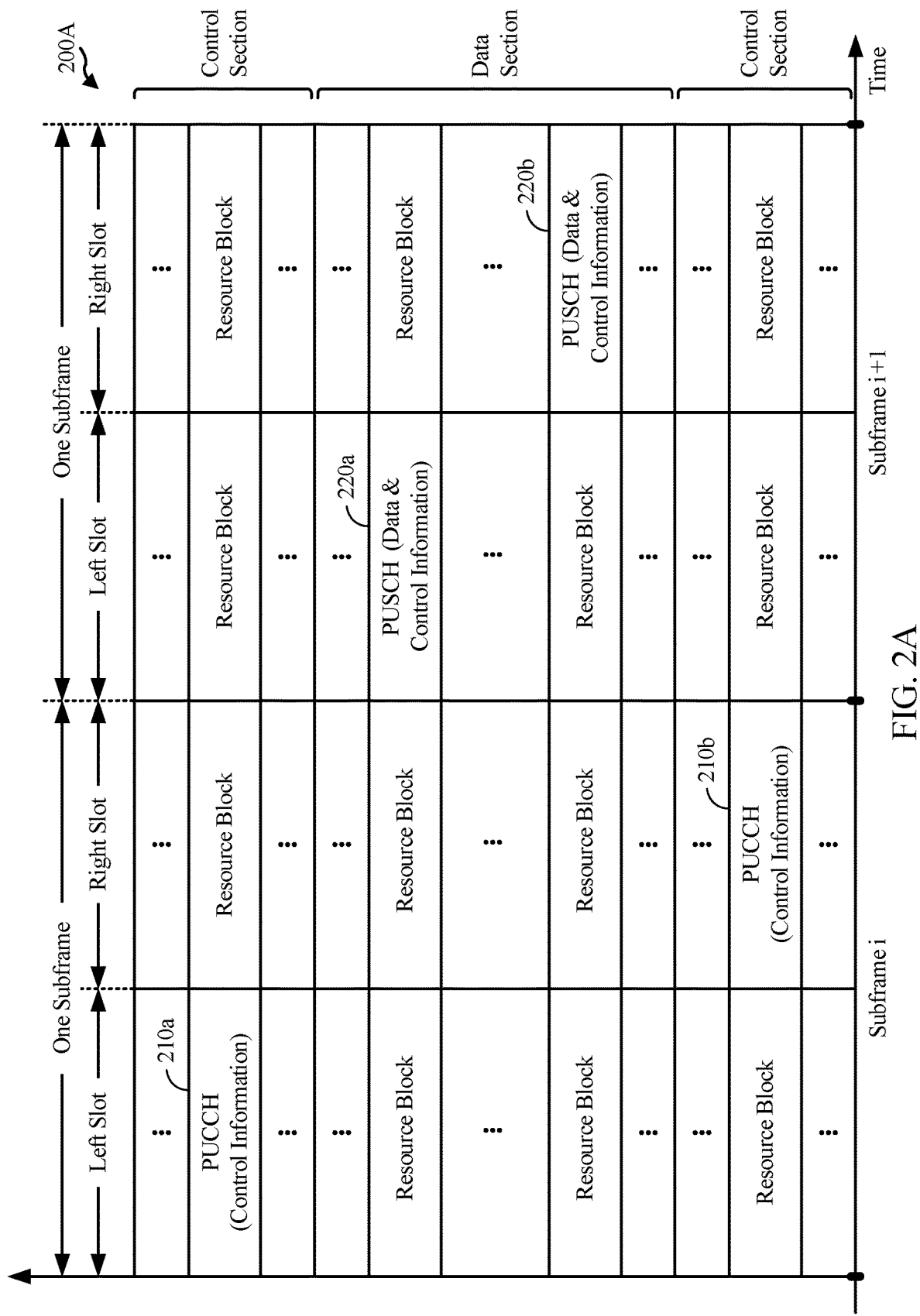
FIG. 2A shows an example format for the uplink in Long Term Evolution (LTE), in accordance with certain aspects of the present disclosure.

FIG. 2A shows an exemplary format 200A for the uplink in LTE. The available resource blocks for the uplink may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The design in FIG. 2A results in the data section including contiguous subcarriers, which may allow a single UE to be assigned all of the contiguous subcarriers in the data section.

A UE may be assigned resource blocks in the control section to transmit control information to an eNB. The UE may also be assigned resource blocks in the data section to transmit data to the eNB. The UE may transmit control information in a Physical Uplink Control Channel (PUCCH) 210a, 210b on the assigned resource blocks in the control section. The UE may transmit only data or both data and control information in a Physical Uplink Shared Channel (PUSCH) 220a, 220b on the assigned resource blocks in the data section. An uplink transmission may span both slots of a subframe and may hop across frequency as shown in FIG. 2A.

A UE may be within the coverage of multiple eNBs. One of these eNBs may be selected to serve the UE. The serving eNB may be selected based on various criteria such as received power, pathloss, signal-to-noise ratio (SNR), etc.

A UE may operate in a dominant interference scenario in which the UE may observe high interference from one or more interfering eNBs. A dominant interference scenario may occur due to restricted association. For example, in FIG. 1, UE 120y may be close to femto eNB 110y and may have high received power for eNB 110y. However, UE 120y may not be able to access femto eNB 110y due to restricted association and may then connect to macro eNB 110c with lower received power (as shown in FIG. 1) or to femto eNB 110z also with lower received power (not shown in FIG. 1). UE 120y may then observe high interference from femto eNB 110y on the downlink and may also cause high interference to eNB 110y on the uplink.

A dominant interference scenario may also occur due to range extension, which is a scenario in which a UE connects to an eNB with lower pathloss and lower SNR among all eNBs detected by the UE. For example, in FIG. 1, UE 120x may detect macro eNB 110b and pico eNB 110x and may have lower received power for eNB 110x than eNB 110b. Nevertheless, it may be desirable for UE 120x to connect to pico eNB 110x if the pathloss for eNB 110x is lower than the pathloss for macro eNB 110b. This may result in less interference to the wireless network for a given data rate for UE 120x.

In an aspect, communication in a dominant interference scenario may be supported by having different eNBs operate on different frequency bands. A frequency band is a range of frequencies that may be used for communication and may be given by (i) a center frequency and a bandwidth or (ii) a lower frequency and an upper frequency. A frequency band may also be referred to as a band, a frequency channel, etc. The frequency bands for different eNBs may be selected such that a UE can communicate with a weaker eNB in a dominant interference scenario while allowing a strong eNB to communicate with its UEs. An eNB may be classified as a "weak" eNB or a "strong" eNB based on the received power of signals from the eNB received at a UE (and not based on the transmit power level of the eNB).

Figure 3:
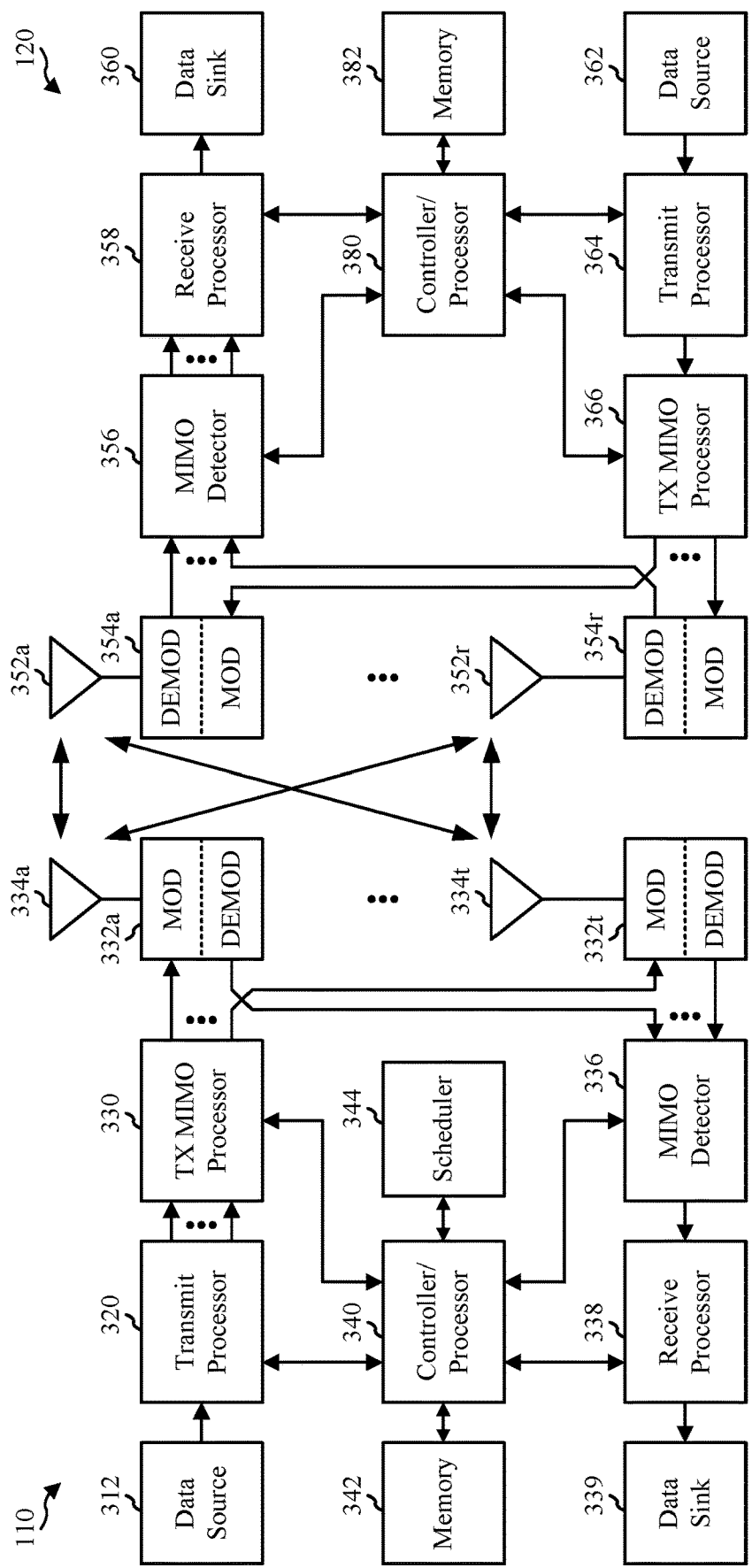
FIG. 3 shows a block diagram conceptually illustrating an example of a Node B in communication with a user equipment device (UE) in a wireless communications network, in accordance with certain aspects of the present disclosure.

FIG. 3 is a block diagram of a design of a base station or an eNB 110 and a UE 120, which may be one of the base stations/eNBs and one of the UEs in FIG. 1. For a restricted association scenario, the eNB 110 may be macro eNB 110c in FIG. 1, and the UE 120 may be UE 120y. The eNB 110 may also be a base station of some other type. The eNB 110 may be equipped with T antennas 334a through 334t, and the UE 120 may be equipped with R antennas 352a through 352r, where in general T≥1 and R≥1.

At the eNB 110, a transmit processor 320 may receive data from a data source 312 and control information from a controller/processor 340. The control information may be for the PBCH, PCFICH, PHICH, PDCCH, etc. The data may be for the PDSCH, etc. The transmit processor 320 may process (e.g., encode and symbol map) the data and control information to obtain data symbols and control symbols, respectively. The transmit processor 320 may also generate reference symbols, e.g., for the PSS, SSS, and cell-specific reference signal. A transmit (TX) multiple-input multiple-output (MIMO) processor 330 may perform spatial processing (e.g., precoding) on the data symbols, the control symbols, and/or the reference symbols, if applicable, and may provide T output symbol streams to T modulators (MODs) 332a through 332t. Each modulator 332 may process a respective output symbol stream (e.g., for OFDM, etc.) to obtain an output sample stream. Each modulator 332 may further process (e.g., convert to analog, amplify, filter, and upconvert) the output sample stream to obtain a downlink signal. T downlink signals from modulators 332a through 332t may be transmitted via T antennas 334a through 334t, respectively.

At the UE 120, antennas 352a through 352r may receive the downlink signals from the eNB 110 and may provide received signals to demodulators (DEMODs) 354a through 354r, respectively. Each demodulator 354 may condition (e.g., filter, amplify, downconvert, and digitize) a respective received signal to obtain input samples. Each demodulator 354 may further process the input samples (e.g., for OFDM, etc.) to obtain received symbols. A MIMO detector 356 may obtain received symbols from all R demodulators 354a through 354r, perform MIMO detection on the received symbols, if applicable, and provide detected symbols. A receive processor 358 may process (e.g., demodulate, deinterleave, and decode) the detected symbols, provide decoded data for the UE 120 to a data sink 360, and provide decoded control information to a controller/processor 380.

On the uplink, at the UE 120, a transmit processor 364 may receive and process data (e.g., for the PUSCH) from a data source 362 and control information (e.g., for the PUCCH) from the controller/processor 380. The transmit processor 364 may also generate reference symbols for a reference signal. The symbols from transmit processor 364 may be precoded by a TX MIMO processor 366 if applicable, further processed by modulators 354a through 354r (e.g., for SC-FDM, etc.), and transmitted to the eNB 110. At the eNB 110, the uplink signals from the UE 120 may be received by the antennas 334, processed by the demodulators 332, detected by a MIMO detector 336 if applicable, and further processed by a receive processor 338 to obtain decoded data and control information sent by the UE 120. The receive processor 338 may provide the decoded data to a data sink 339 and the decoded control information to the controller/processor 340.

The controllers/processors 340 and 380 may direct the operation at the eNB 110 and the UE 120, respectively. The controller/processor 340, receive processor 338, and/or other processors and modules at the eNB 110 may perform or direct operations 800 in FIG. 8 and/or other processes for the techniques described herein. The memories 342 and 382 may store data and program codes for the eNB 110 and the UE 120, respectively. A scheduler 344 may schedule UEs for data transmission on the downlink and/or uplink.

Example Resource Partitioning

According to certain aspects of the present disclosure, when a network supports enhanced inter-cell interference coordination (eICIC), the base stations may negotiate with each other to coordinate resources in order to reduce or eliminate interference by the interfering cell giving up part of its resources. In accordance with this interference coordination, a UE may be able to access a serving cell even with severe interference by using resources yielded by the interfering cell.

For example, a femto cell with a closed access mode (i.e., in which only a member femto UE can access the cell) in the coverage area of an open macro cell may be able to create a "coverage hole" (in the femto cell's coverage area) for a macro cell by yielding resources and effectively removing interference. By negotiating for a femto cell to yield resources, the macro UE under the femto cell coverage area may still be able to access the UE's serving macro cell using these yielded resources.

In a radio access system using OFDM, such as Evolved Universal Terrestrial Radio Access Network (E-UTRAN), the yielded resources may be time based, frequency based, or a combination of both. When the coordinated resource partitioning is time based, the interfering cell may simply not use some of the subframes in the time domain. When the coordinated resource partitioning is frequency based, the interfering cell may yield subcarriers in the frequency domain. With a combination of both frequency and time, the interfering cell may yield frequency and time resources.

Figure 4:
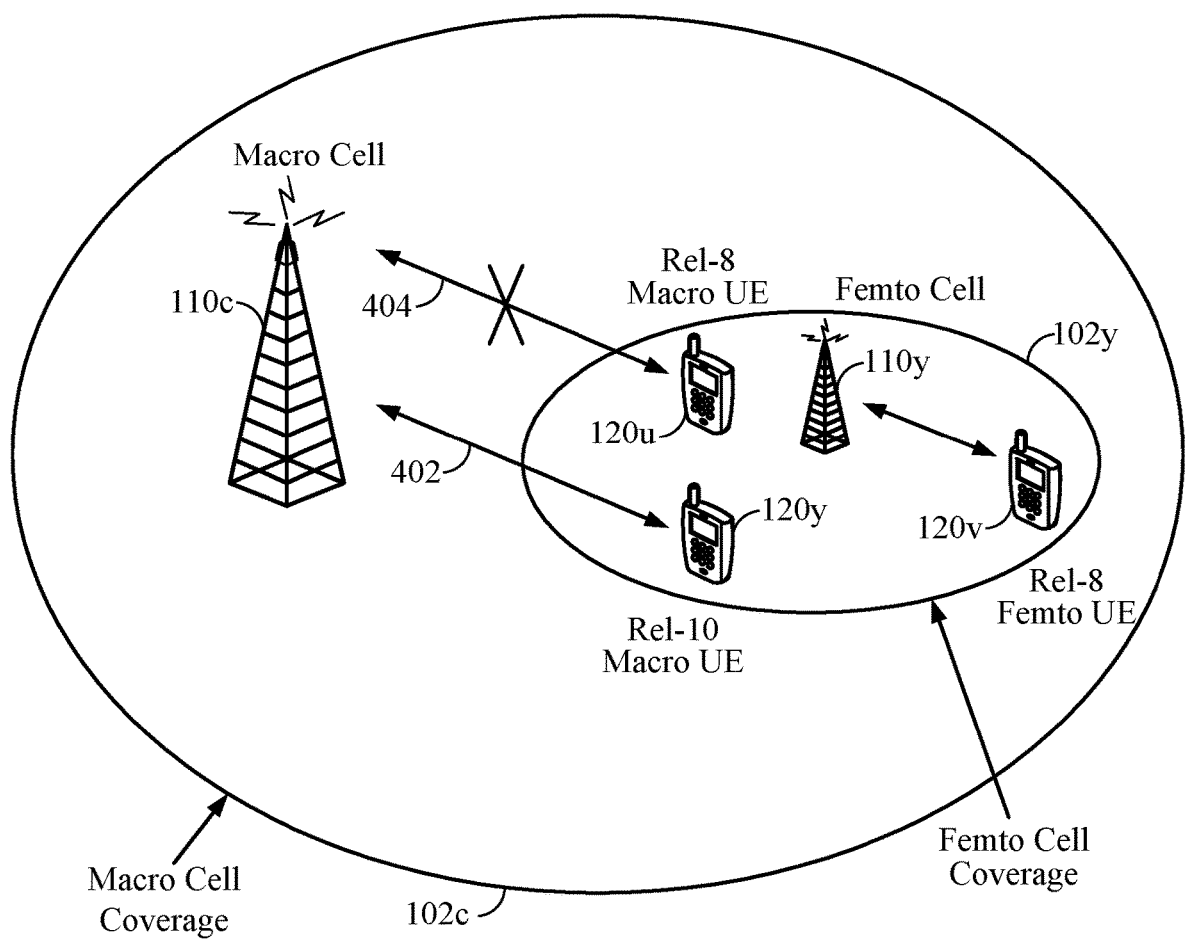
FIG. 4 illustrates an example heterogeneous network (HetNet), in accordance with certain aspects of the present disclosure.

FIG. 4 illustrates an example scenario where eICIC may allow a macro UE 120y supporting eICIC (e.g., a Rel-10 macro UE as shown in FIG. 4) to access the macro cell 110c even when the macro UE 120y is experiencing severe interference from the femto cell y, as illustrated by the solid radio link 402. A legacy macro UE 120u (e.g., a Rel-8 macro UE as shown in FIG. 4) may not be able to access the macro cell 110c under severe interference from the femto cell 110y, as illustrated by the broken radio link 404. A femto UE 120v (e.g., a Rel-8 femto UE as shown in FIG. 4) may access the femto cell 110y without any interference problems from the macro cell 110c.

According to certain aspects, networks may support eICIC, where there may be different sets of partitioning information. A first of these sets may be referred to as Semi-static Resource Partitioning Information (SRPI). A second of these sets may be referred to as Adaptive Resource Partitioning Information (ARPI). As the name implies, SRPI typically does not change frequently, and SRPI may be sent to a UE so that the UE can use the resource partitioning information for the UE's own operations.

As an example, the resource partitioning may be implemented with 8 ms periodicity (8 subframes) or 40 ms periodicity (40 subframes). According to certain aspects, it may be assumed that frequency division duplexing (FDD) may also be applied such that frequency resources may also be partitioned. For communications via the downlink (e.g., from a cell node B to a UE), a partitioning pattern may be mapped to a known subframe (e.g., a first subframe of each radio frame that has a system frame number (SFN) value that is a multiple of an integer N, such as 4). Such a mapping may be applied in order to determine resource partitioning information (RPI) for a specific subframe. As an example, a subframe that is subject to coordinated resource partitioning (e.g., yielded by an interfering cell) for the downlink may be identified by an index:

$$\text{Index}_{SRPI\_DL}=(SFN*10+\text{subframe number})\bmod 8$$

For the uplink, the SRPI mapping may be shifted, for example, by 4 ms. Thus, an example for the uplink may be:

$$\text{Index}_{SRPI\_UL}=(SFN*10+\text{subframe number}+4)\bmod 8$$

SRPI may use the following three values for each entry:
U (Use): this value indicates the subframe has been cleaned up from the dominant interference to be used by this cell (i.e., the main interfering cells do not use this subframe);
N (No Use): this value indicates the subframe shall not be used; and
X (Unknown): this value indicates the subframe is not statically partitioned. Details of resource usage negotiation between base stations are not known to the UE.

Another possible set of parameters for SRPI may be the following:
U (Use): this value indicates the subframe has been cleaned up from the dominant interference to be used by this cell (i.e., the main interfering cells do not use this subframe);
N (No Use): this value indicates the subframe shall not be used;
X (Unknown): this value indicates the subframe is not statically partitioned (and details of resource usage negotiation between base stations are not known to the UE); and
C (Common): this value may indicate all cells may use this subframe without resource partitioning. This subframe may be subject to interference, so that the base station may choose to use this subframe only for a UE that is not experiencing severe interference.

The serving cell's SRPI may be broadcasted over the air. In E-UTRAN, the SRPI of the serving cell may be sent in a master information block (MIB), or one of the system information blocks (SIBs). A predefined SRPI may be defined based on the characteristics of cells, e.g. macro cell, pico cell (with open access), and femto cell (with closed access). In such a case, encoding of SRPI in the system overhead message may result in more efficient broadcasting over the air.

The base station may also broadcast the neighbor cell's SRPI in one of the SIBs. For this, SRPI may be sent with its corresponding range of physical cell identities (PCIs).

ARPI may represent further resource partitioning information with the detailed information for the 'X' subframes in SRPI. As noted above, detailed information for the 'X' subframes is typically only known to the base stations, and a UE does not know it.

Figure 6:
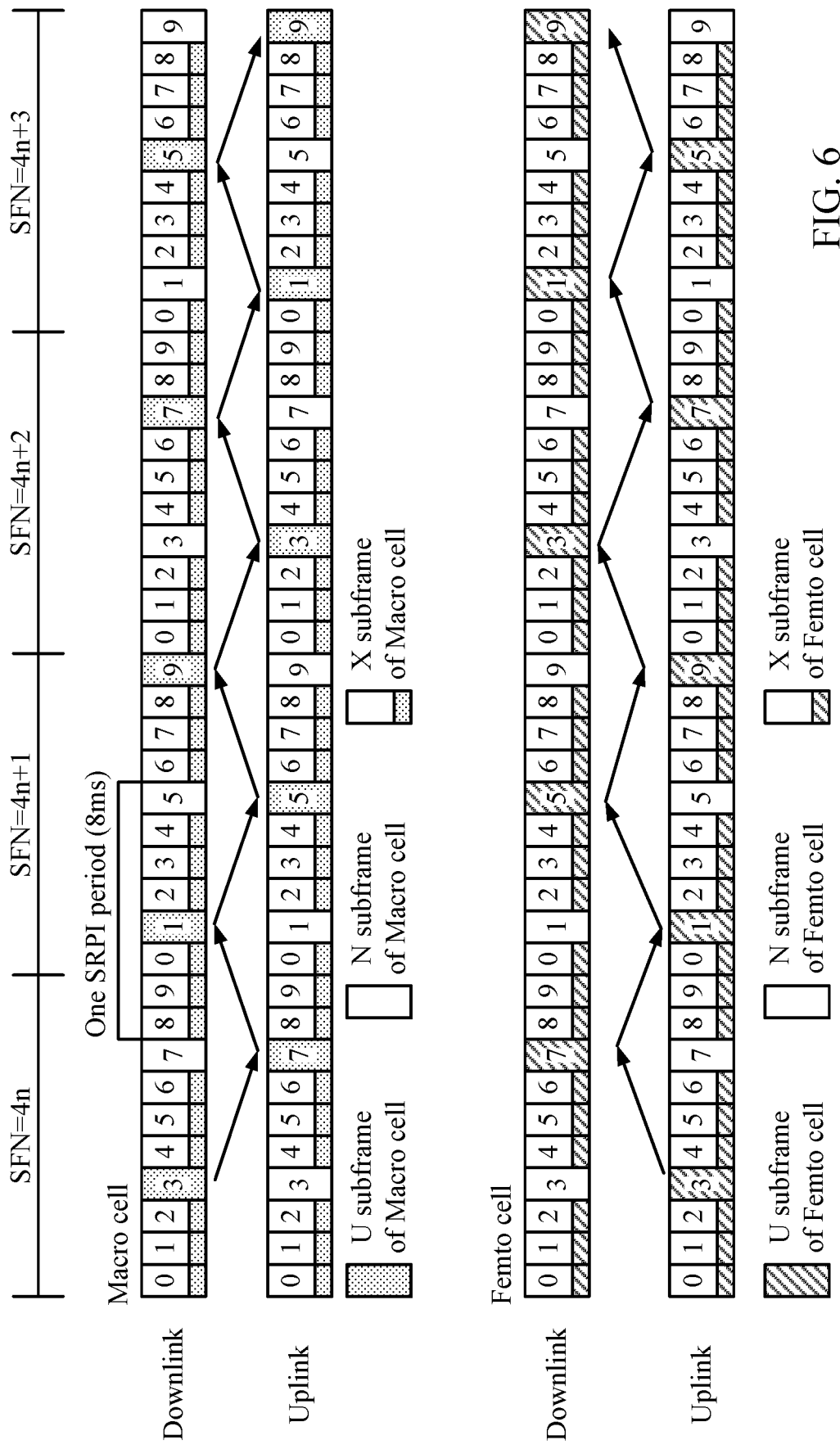
FIG. 6 illustrates example cooperative partitioning of subframes in a heterogeneous network, in accordance with certain aspects of the present disclosure.

FIGS. 5 and 6 illustrate examples of SRPI assignment in the scenario with macro and femto cells. A U, N, X, or C subframe is a subframe corresponding to a U, N, X, or C SRPI assignment.

Uplink CoMP—Power Control Management

In current CoMP deployment scenarios, e.g., Scenario-3 or Scenario-4, there is a pathloss (PL) mismatch between the downlink (DL) serving cell and uplink (UL) serving cell. In cases where the UL and DL serving cells are mismatched, open loop power control (OLPC) based on PL compensation is wrong. A variety of scenarios may be considered in which PL compensation may be performed in different manners, Scenario-3 and Scenario-4 are described below.

In some scenarios, decoupling of control and data (e.g., with data transmitted from one transmission point and control transmitted from another transmission point) may be of relative importance with respect to HetNet CoMP. One such scenario is referred to as CoMP "Scenario-3" in which transmission points have different cell-IDs (i.e., control and data transmissions are decoupled). In this case, a UE may receive control information from a transmission point that is different from the transmission point of data. For example, control information may be received on, for example, legacy PDCCH from a macro-cell and data may be received from Remote Radio Heads (RRHs).

Figure 7:
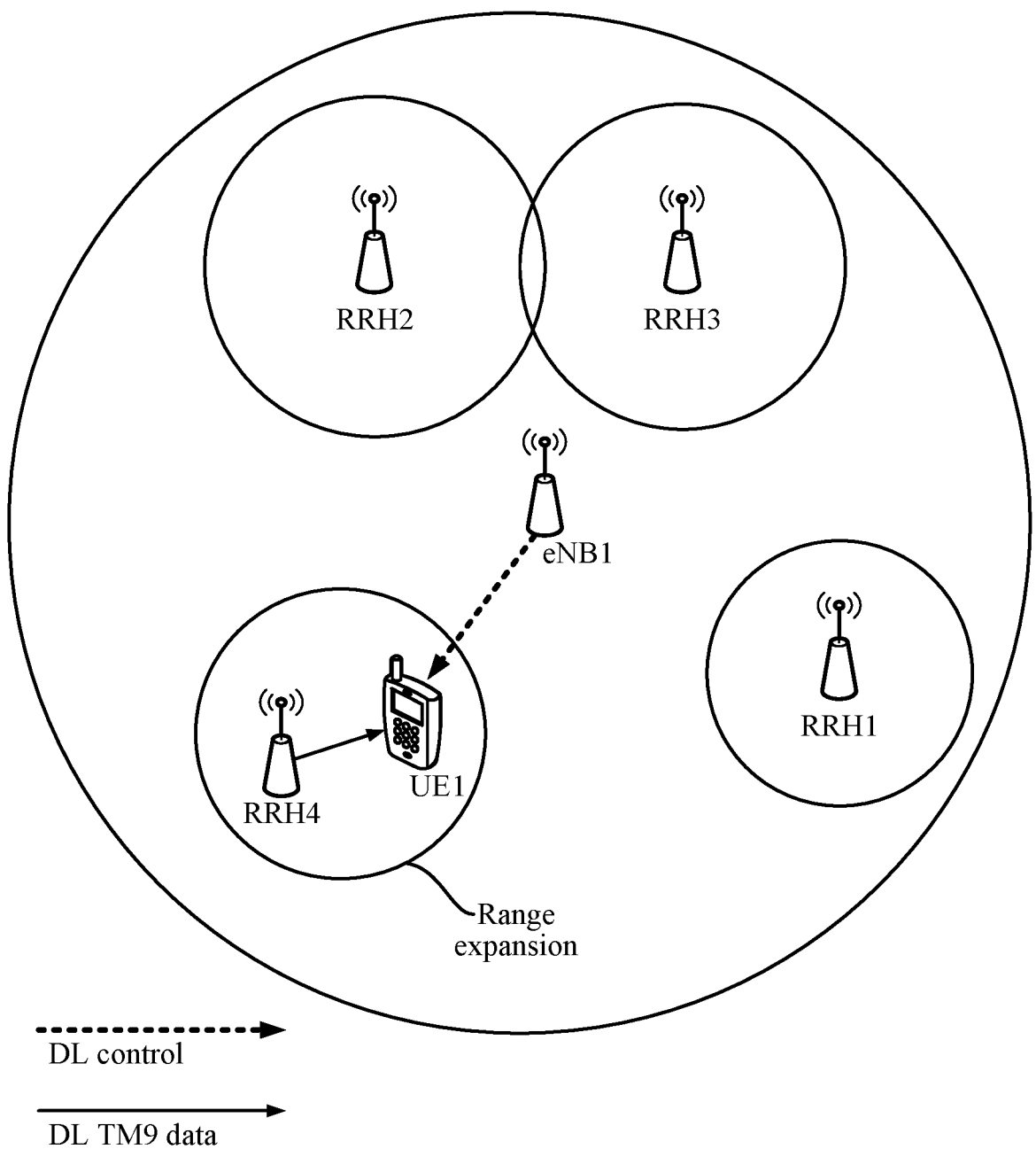
FIG. 7 illustrates an example scenario of a Coordinated MultiPoint (CoMP) transmission, in accordance with certain aspects of the present disclosure.

FIG. 7 illustrates an example scenario of a Coordinated MultiPoint (CoMP) transmission, in accordance with certain aspects of the present disclosure. As seen in FIG. 7, in the UL the UE1 is closest to RRH4. It may, therefore, be desirable that UE1 is served by RRH4 on the uplink. As seen in FIG. 7, UE1 may receive DL TM9 data from RRH4 and may received DL control from eNB1. In this case, UE1 measures the PL on the DL from eNB1 and applies transmit power to RRH4.

However, there may be a PL mismatch between the paths from the eNB1 to UE1 and the UE1 to RRH 4.

A second scenario is referred to as CoMP "Scenario-4" in which transmission points share the same cell-ID. Consequently, control information transmitted via the PDCCH is common to all points in the CoMP cluster.

Figure 8:
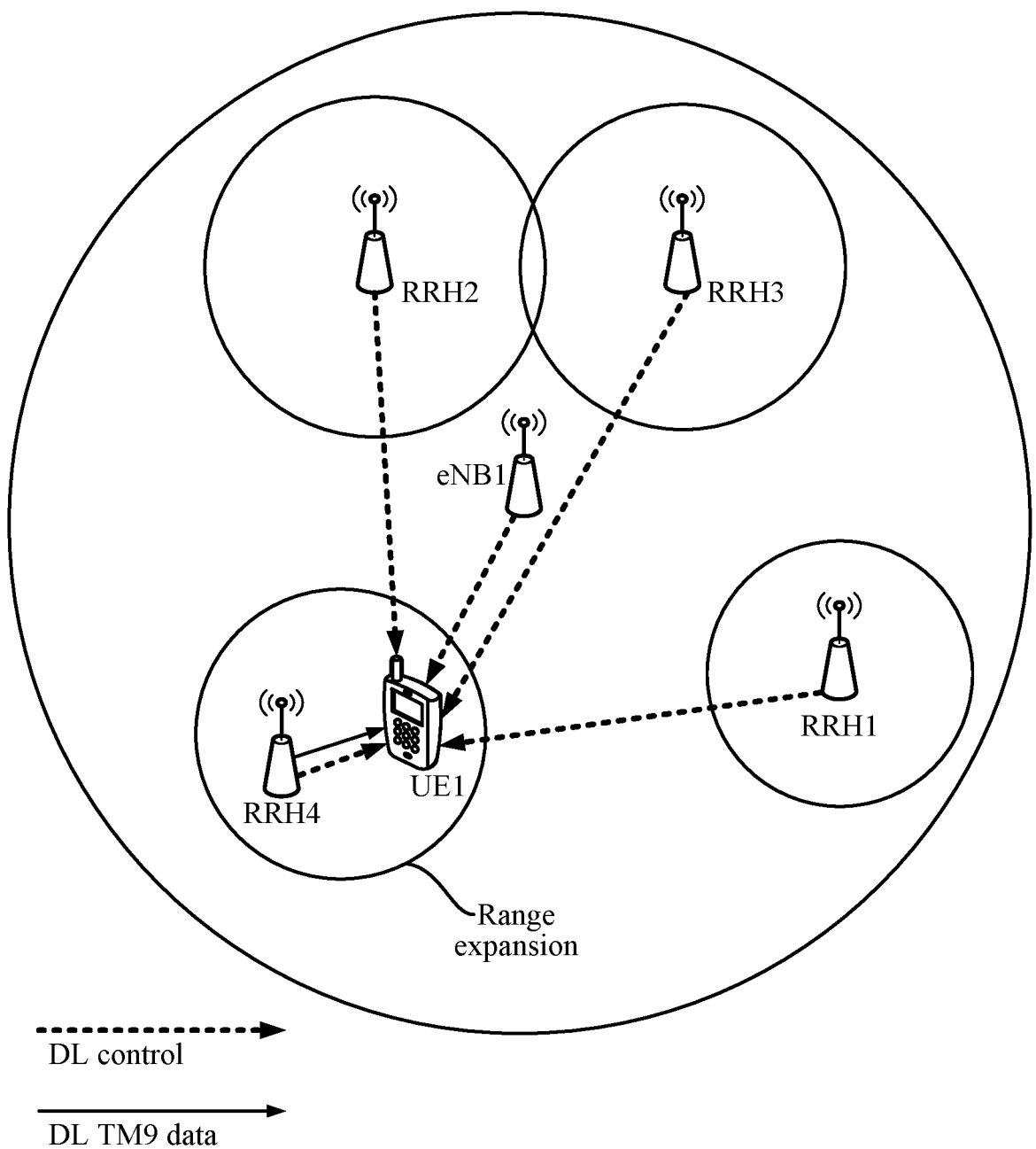
FIG. 8 illustrates another example scenario of a Coordinated MultiPoint (CoMP) transmission, in accordance with certain aspects of the present disclosure.

As seen in FIG. 8, DL signal is transmitted from one macro cell (i.e., eNB1) and four picocells (i.e., RRH1, RRH2, RRH3, and RRH4), but the uplink (UL) transmission may use only RRH4, since RRH 4 is closest to the UE1. This conserves power on UE1.

However, there is a PL mismatch between DL PL measurement and UL application. On the DL, the PL is calculated as an aggregate weighted by the transmission power. On the UL, the PL is dependent on one or more nodes. Reference signal (RS) power definition may be required when transmitted from all cells.

Some possible solutions are detailed below as approaches 1a, 1b and 2. These solutions may be applicable when the UE is stationary and/or moving with reduced speed. However, when the UE is mobile (i.e., moving with relatively higher speed), approaches 1a, 1b and 2 may exhibit different drawbacks.

A first approach involves RRC-based solutions—without use of channel state information reference signaling (CSI-RS). In some embodiments, transmit power may be adjusted for random access channel (RACH) transmissions. RACH power is determined based on full open loop PL compensation and PREAMBLE_RECEIVED_TARGET_POWER. Since the PL measurement is inaccurate, PREAMBLE_RECEIVED_TARGET_POWER may be reduced for all the users within the cell and then power may be ramped up as needed for transmission.

In determining RACH power it is desirable to use low power for initial RACH transmissions in order to avoid interference to other cells. On the other hand, starting with a very low power delays the RACH procedure.

In some embodiments, for Scenario 3, the desired range of RACH power may be derived based on the eNB power difference in the HetNet as well as cell RE bias. The UE may associate with the eNB based on the following equations:

$$P_m - PL_m > P_p PL_p + \text{bias}$$

which may be re-written as:

$$PL_m < PL_p + (P_m - P_p - \text{bias})$$

PL mismatch reduces with the increase of Cell Range Expansion (CRE) bias. Initial RACH power may be set according to power difference between the nodes and bias values for CRE. For eNB power 46 dB and RRH power 30 dB scenarios, a bias of 0 dB, 6 dB, 9 dB, and 12 dB may have a worst PL error of a 16 dB, 10 dB, 7 dB, and 4 dB, respectively.

Advantages to this approach may include minimal changes in the specification. A potential drawback may be possible delay for users, since this is approach relates to a cell configuration.

In some embodiments, Message 3 transmission power may be adjusted. Herein, a bit length used to indicate transmit power control (TPC) commands may be increased for better range. Current TPC commands for Message 3 utilize 3 bits in the 20-bit UL grant. If RACH is in the right power range, for example, −6 dB to 8 dB, then this length should be enough for Message 3 power setting. Alternatively, if RACH is sent at high power to reduce delay, TPC command bits may be increased for Message 3.

Techniques may also be used to adjust transmit power for subsequent UL transmissions (i.e., after RACH and Message 3 transmissions), based on the Message 3 transmission power. If Message 3 is on target, other transmissions can be adjusted based on Message 3. Approach 1a relies on closed loop power control adjustment. Approach 1b relies on UE specific PL adjustment, PL delta or P0.

In some embodiments, for approach 1a, in contention based RACH, low transmission power is transmitted initially. This approach relies on a slow start because the PL difference is unknown. For non-contention based RACH, for example, when there is a loss of UL synchronization and PL and the base station the UE is communicating with is known, the slow start may be avoided and delay may be avoided. This provides support for larger power control step size in the case of large PL difference.

In some embodiments, a new power control (PC) command can be added to enhanced-PDCCH (EPDCCH) design if no PDCCH change desired.

In some embodiments, for approach 1a, eNB reception-based adaptation may be used to turn off OLPC. The eNB may have knowledge of which node is receiving the UL signal. The eNB may be configured to control when to turn off or turn on OLPC. For high mobility UEs, OLPC may be turned off. For low mobility UEs with correct DL association, OLPC kept on. For low mobility UE with different DL and UL associations, both the aforementioned options work well. eNB may rely completely on closed loop adjustment or use both open loop and closed loop together.

A second approach involves CSI-RS based solutions. Herein, whenever there is a PL mismatch, a different CSI-RS is provided. For example, referring back to FIG. 7, in Scenario-3 CoMP, a CSI-RS may be provided from RRH4 to UE1. The CSI-RS may be designed to compensate for PL mismatch.

In some embodiments, each of the RRHs transmits on its own CSI-RS port to allow PL measurements. The PL measurement may be correct from the UL serving cell perspective and the same PL algorithm may be reused with the PL compensation.

In some embodiments, signaling of specific CSI-RS ports for PL measurement may be provided to the UE. The RS power may also be UE specific. However, the CSI-RS may need to be configured prior to utilization. Also, CSI-RS signaling overhead may be included when UE mobility is high. For example, when the UE passes through many cells, it may be required to signal many different CSI-RS configurations as the UE goes from cell to cell.

Enhancements for the CRS-based approach are provided. In some embodiments, for Scenario-3, autonomous OLPC may be based on CRS interference cancelation (CRS-IC). For advanced UEs with IC, the UE may detect low power nodes at large bias. The eNB may signal UE the sets of UL CoMP nodes with corresponding CRS configurations and power settings. The UE may autonomously apply the PL compensation to the cell with the smallest PL. The UE knows the pico-cell that is closest to it based on the CSI-RS received by the UE. The UE may receive CSI-RS from different cells. From the eNB, the UE receives the CSI-RS transmit power. Subtracting the received power from the transmitted power, the UE can calculate the PL. The UE associates with the cell having the smallest PL for the UL transmission and applies the OLPC based on that cell.

In some embodiments, the UE may auto adjust the PL compensation based on its knowledge of the nearest eNB. This approach requires minimum signaling overhead, i.e., eNB signaling to the UE existence of nearby eNBs and the power settings of the nearby eNBs.

Other Enhancements for CRS Based Approach are also provided. In some embodiments, eNB-based power shaping and partial PL compensation may be used. One drawback of approach 1a is that it does not have implicit power-shaping. Implicit power shaping is achieved by eNB-based power-shaping algorithms. In a first step of one algorithm, the eNB calculates PL based on the received signal power, the UE's maximum transmit power, and the UE's power headroom report. In a second set of the algorithm, the eNB transmits a power control command to adjust the UE's transmit power, in order to effectively achieve partial PL compensation based rate shaping.

In some embodiments, an eNB-based direct interference management scheme may be used. Instead of relying on power/rate shaping, eNBs in the UL CoMP set may directly adjust the power of UEs that are causing interference to a desired level, thus, directly controlling inter-cell interference.

Other Enhancements for CSI-RS are also possible. One drawback of a CRS-based approach is the requirement for signaling of CSI-RS ports when the UE is mobile. In some embodiments, a list of CSI-RS ports and UE autonomous selection of CSI-RS ports based on PL measurements may be defined. The eNB may signal the list of CSI-RS ports for the UE to model along with the transmission power for each of the CSI-RS ports. For example, the eNB may send the UE the complete list of ports and the UE may then performs measurements of these ports in order to identify the PL to each of the nodes. The UE may autonomously apply PL compensation based on the smallest PL measured from the list of CSI-RS ports and may assume that the nodes with the smallest PL will be the UL reception points.

In some embodiments, the eNB may be required to signal the UE disjoint CSI-RS ports specified for DL CoMP measurements and UL CoMP measurements in the event that DL and UL may have different CoMP sets.

Enhancements for a Joint Approach based on both CSI-RS and CRS are also possible. In some embodiments, the UE may autonomously switch the OLPC based on CSI-RS and CRS. The CRS is used to measure PL. Additional CSI-RS ports may be signaled to the UE only to switch the OLPC on or off. Alternatively, in some embodiments, CSI-RS may be utilized to decide which PL, measured from CRS, is to be used in power control.

In some embodiments, CRS-IC switching based on CSI-RS detection may be used. For scenario 3, UE uses CSI-RS to discover cell in the event only CRS-IC is supported by UE, but does use a Primary Synchronization Signal (PSS) or Secondary Synchronization Signal (SSS) IC. Once the UE discovers the cell from CSI-RS, the UE turns on CRS-IC.

In some embodiments, the CSI-RS may be used for PL delta measurement. The CSI-RS-based measurement is performed with a reduced dynamic range for PL delta, for example, 0-16 dB, and all other values are pruned out.

Figure 9:
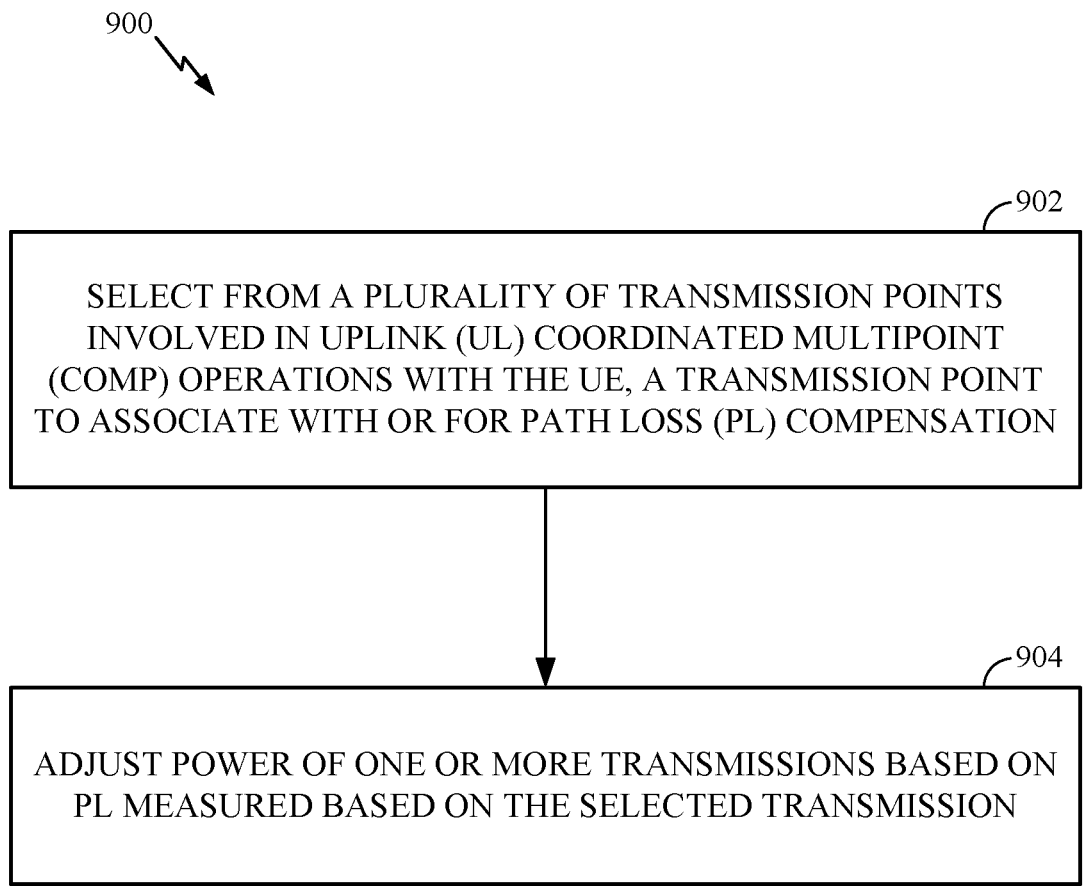
FIG. 9 illustrates example operations that may be performed by a user equipment (UE), in accordance with aspects of the present disclosure.

FIG. 9 illustrates example operations 900 that may be performed, for example, by a user equipment (UE) to compensate for differences in path loss. The operations 900 begin, at 902, by selecting, from a plurality of transmission points involved in uplink (UL) coordinated multipoint (CoMP) operations with the UE, a transmission point to associate with for path loss (PL) compensation. At 904, the UE adjusts power of one or more transmissions based on path loss measured based on the selected transmission point.

Figure 10:
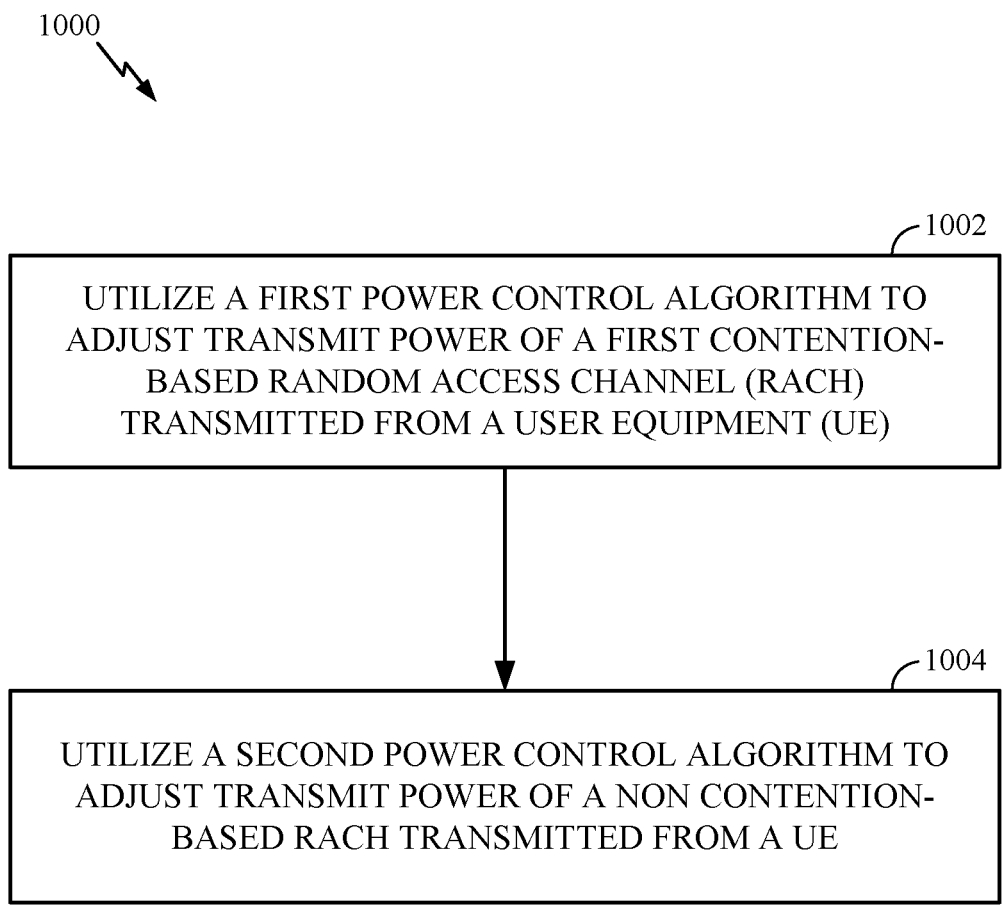
FIG. 10 illustrates example operations that may be performed, for example, by a base station to compensate for path loss, in accordance with aspects of the present disclosure.

FIG. 10 illustrates example operations 1000 that may be performed, for example, by a base station (e.g., eNB or other type transmission point) to compensate for path loss. The operations 1000 begin, at 1002, by utilizing a first power control algorithm to adjust transmit power of a first contention-based random access channel (RACH) transmitted from a UE. At 1004, the base station utilizes a second power control algorithm to adjust transmit power of a non contention-based RACH.

Figure 11:
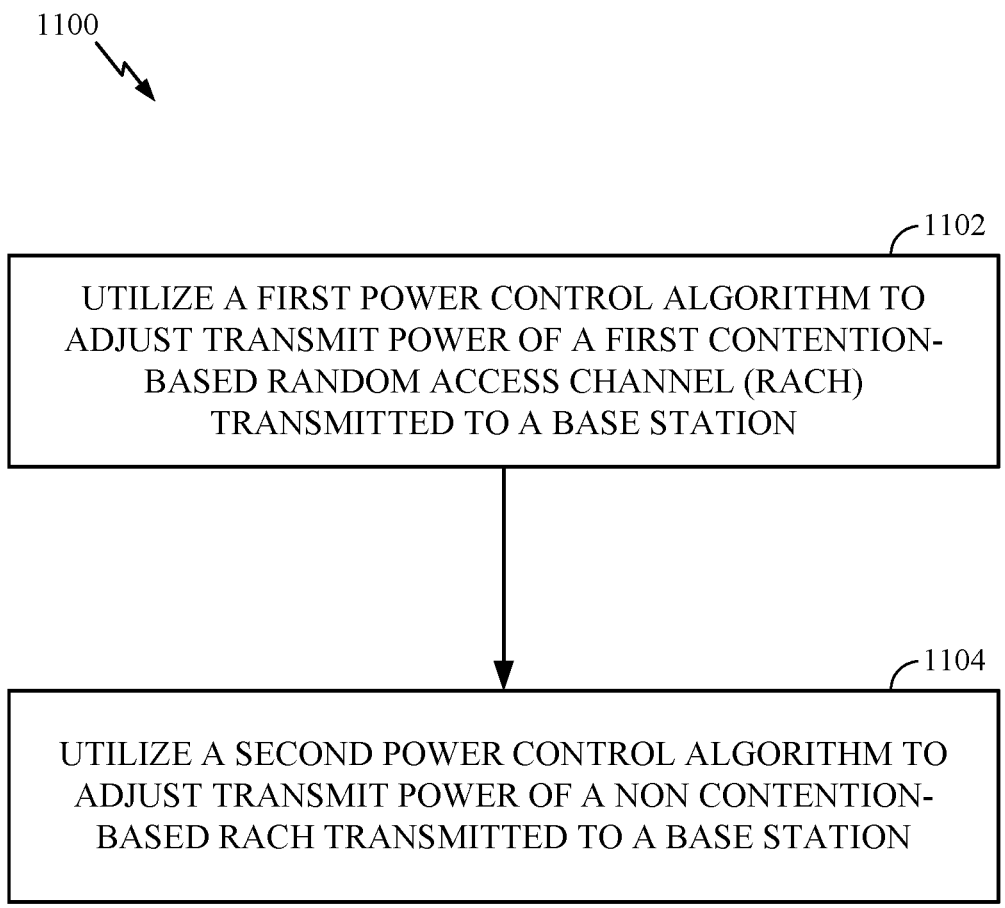
FIG. 11 illustrates example operations that may be performed, for example, by a UE to compensate for path loss, in accordance with aspects of the present disclosure.

FIG. 11 illustrates example operations 1100 that may be performed, for example, by a UE to compensate for path loss. The operations 1100 begin, at 1102, by utilizing a first power control algorithm to adjust transmit power of a first contention-based random access channel (RACH). At 1104, the UE utilizes a second power control algorithm to adjust transmit power of a non contention-based RACH.

Figure 12:
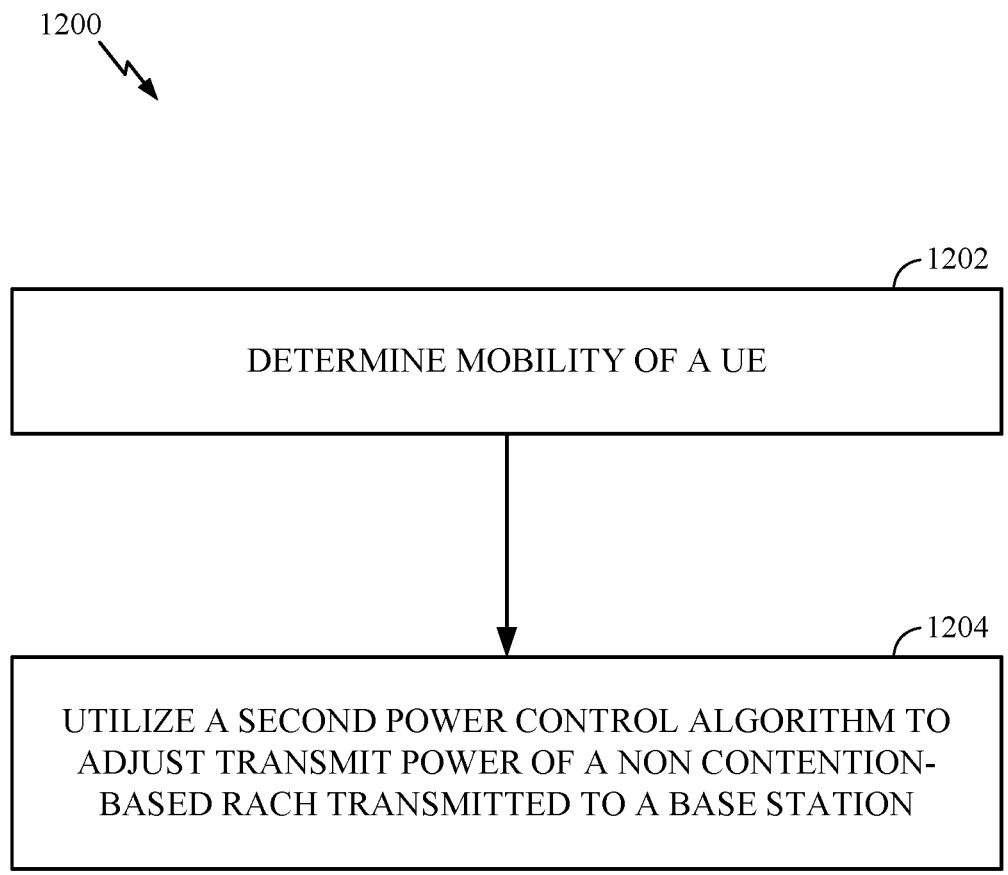
FIG. 12 illustrates example operations that may be performed, for example, by a base station to compensate for path loss, in accordance with aspects of the present disclosure.

FIG. 12 illustrates example operations 1200 that may be performed, for example, by a base station to compensate for path loss. The operations 1200 begin, at 1202, by determining mobility of a UE. At 1204, the base station selects a power control algorithm for use in controlling power of transmissions from the UE, based on the determined mobility.

Figure 13:
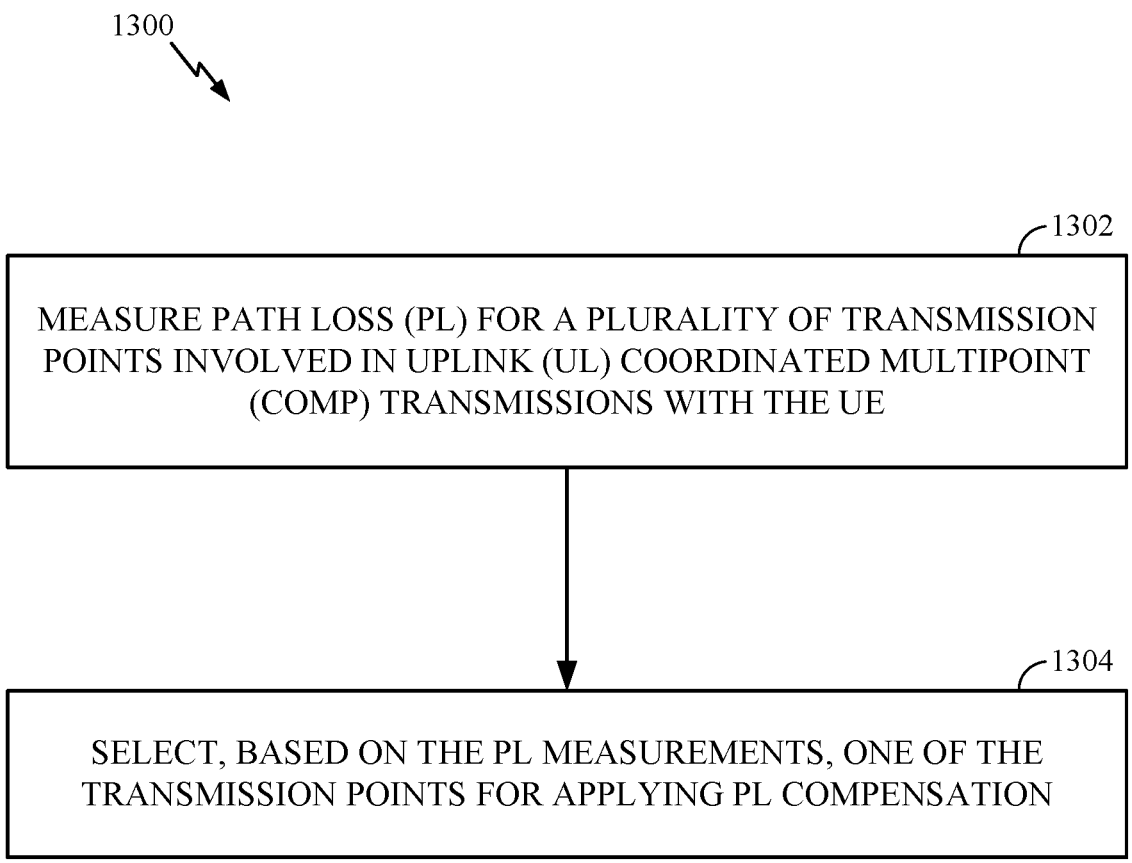
FIG. 13 illustrates example operations that may be performed, for example, by a UE to compensate for path loss, in accordance with aspects of the present disclosure.

FIG. 13 illustrates example operations 1300 that may be performed, for example, by a UE to compensate for path loss. The operations 1300 begin, at 1302, by measuring path loss (PL) for a plurality of transmission points involved in uplink (UL) coordinate multipoint (CoMP) transmissions with the UE. At 1304, the UE selects, based on the PL measurements, one of the transmission points for applying PL compensation.

Figure 14:
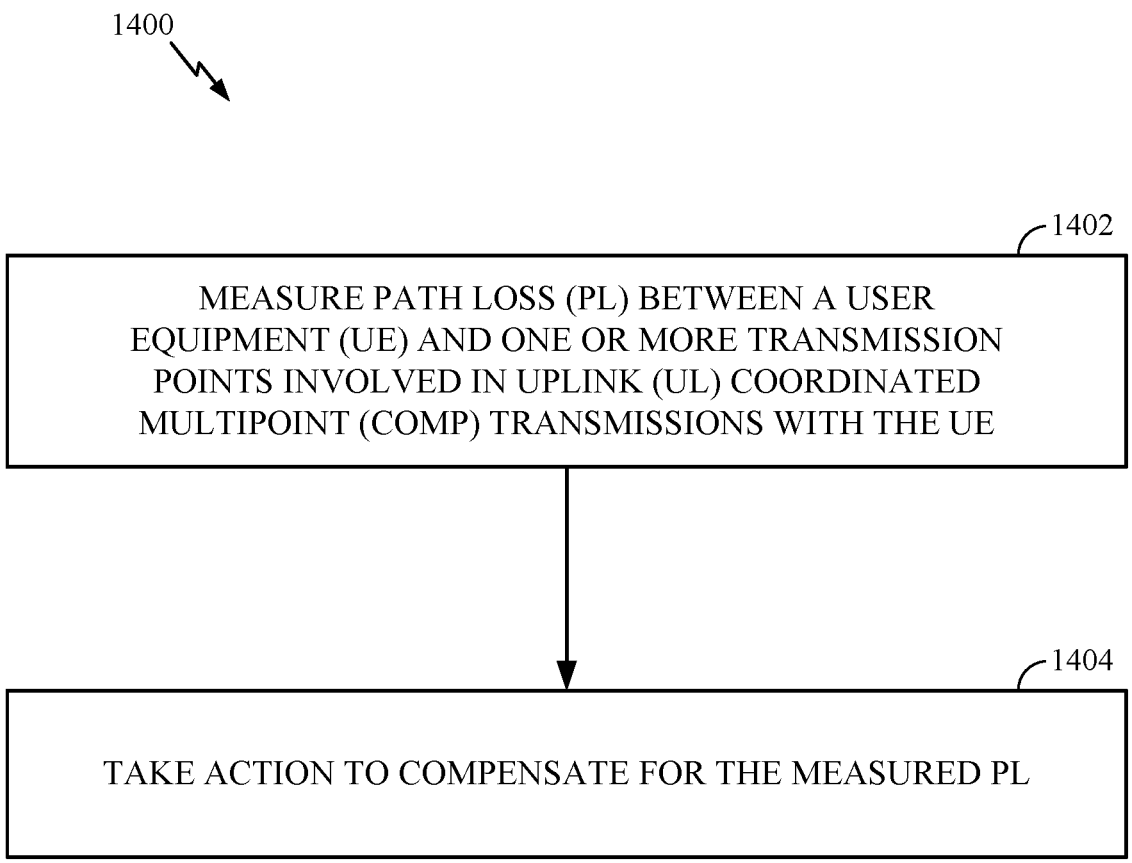
FIG. 14 illustrates example operations that may be performed, for example, by a base station to compensate for path loss, in accordance with aspects of the present disclosure.

FIG. 14 illustrates example operations 1400 that may be performed, for example, by a base station to compensate for path loss. The operations 1400 begin, at 1402, by measuring path loss (PL) between a user equipment (UE) and one or more transmission points involved in uplink (UL) coordinate multipoint (CoMP) transmissions with the UE. At 1404, the base station takes action to compensate for the measured path loss.

Figure 15:
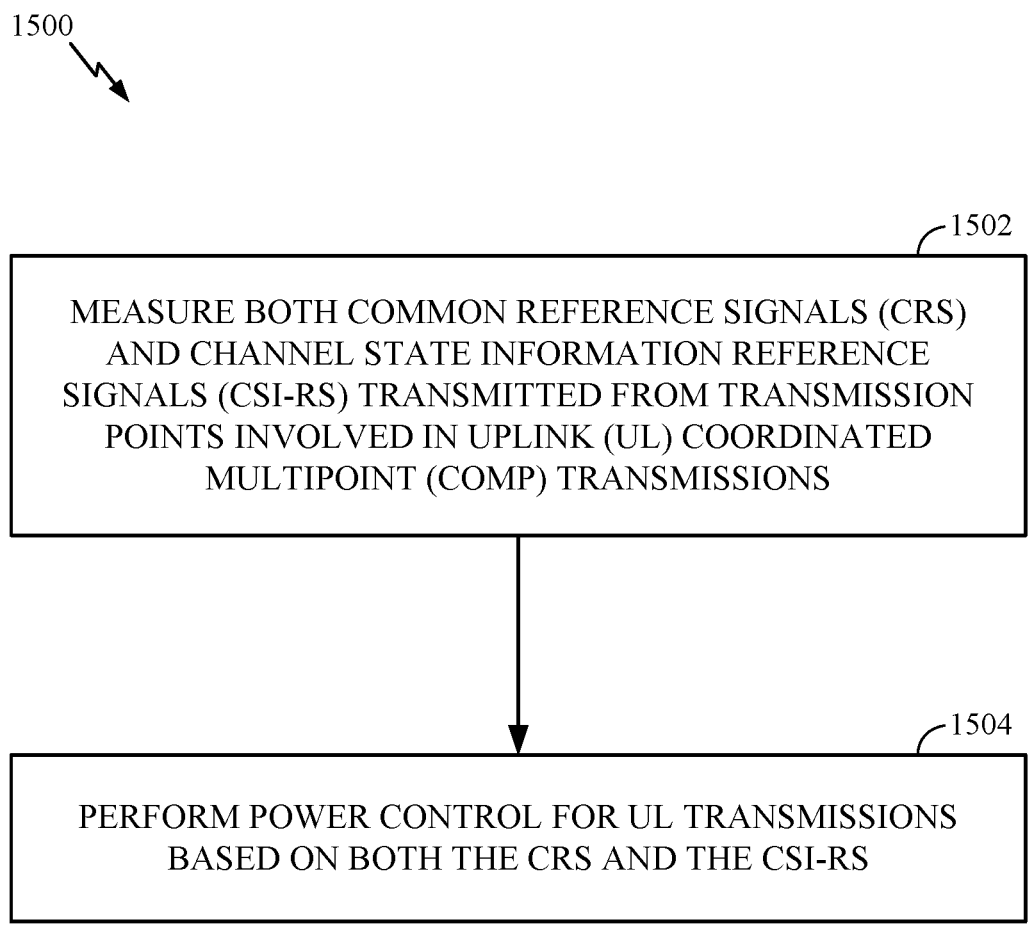
FIG. 15 illustrates example operations that may be performed, for example, by a UE to compensate for path loss, in accordance with aspects of the present disclosure.

FIG. 15 illustrates example operations 1500 that may be performed, for example, by a UE to compensate for path loss. The operations 1500 begin, at 1502, by measuring both common reference signals (CRS) and channel state information reference signals (CSI-RS) transmitted from transmission points involved in uplink (UL) CoMP transmissions. At 1504, the UE performs power control for UL transmissions based on both the CRS and the CSI-RS.

Those of skill in the art would understand that information and signals may be represented using any of a variety of different technologies and techniques. For example, data, instructions, commands, information, signals, bits, symbols and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits and algorithm steps described in connection with the disclosure herein may be implemented as electronic hardware, computer software, or combinations of both. To clearly illustrate this interchangeability of hardware and software, various illustrative components, blocks, modules, circuits and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components or any combination thereof designed to perform the functions described herein. A general-purpose processor may be a microprocessor, but in the alternative, the processor may be any conventional processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM or any other form of storage medium known in the art. An exemplary storage medium is coupled to the processor such that the processor can read information from, and/or write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal. Generally, where there are operations illustrated in Figures, those operations may have corresponding counterpart means-plus-function components with similar numbering.

In one or more exemplary designs, the functions described may be implemented in hardware, software, firmware or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but is to be accorded the widest scope consistent with the principles and novel features disclosed herein.

What is claimed is:

1. A method for controlling transmission power of one or more user equipments (UEs) by a base station in a coordinated multipoint (CoMP) cluster, comprising:
   determining mobility of a UE; and
   selecting a power control algorithm for use in controlling power of transmissions from the UE based, at least in part, on the determined mobility, wherein the selecting comprises:
      disabling open loop power control (OLPC) and enabling closed loop power control (CLPC), for transmission by the UE to a transmission point within the CoMP cluster, in response to determining the mobility of the UE is in a first range higher than a second range, and
   wherein the selecting further comprises:
      determining whether the UE communicates with the same one or more transmission points in the CoMP cluster on the uplink as on the downlink; and
      enabling OLPC and disabling CLPC, for transmission by the UE, in response to determining the mobility of the UE is in the second range lower than the first range and that the UE communicates with the same one or more transmission points on the uplink as on the downlink.

2. The method of claim 1, wherein the selecting further comprises:
   enabling one of OLPC or CLPC in response to determining the mobility of the UE is in the second range lower than the first range and that the UE communicates with different one or more transmission points on the uplink than on the downlink.

3. The method of claim 1, wherein the selecting further comprises:
   enabling both CLPC and OLPC in response to determining the mobility of the UE is in the second range lower than the first range and that the UE communicates with different one or more transmission points on the UL than on the DL.

4. An apparatus for controlling transmission power of one or more user equipments (UEs) in a coordinated multipoint (CoMP) cluster, comprising:

means for determining mobility of a UE; and
means for selecting a power control algorithm for use in controlling power of transmissions from the UE based, at least in part, on the determined mobility, wherein the selecting comprises:
 disabling open loop power control (OLPC) and enabling closed loop power control (CLPC), for transmission by the UE to a transmission point within the CoMP cluster, in response to determining the mobility of the UE is in a first range higher than a second range, and
wherein the selecting comprises:
 determining whether the UE communicates with the same one or more transmission points in the CoMP cluster on the uplink as on the downlink; and
 enabling OLPC and disabling CLPC, for transmission by the UE, in response to determining the mobility of the UE is in the second range lower than the first range and that the UE communicates with the same one or more transmission points on the uplink as on the downlink.

5. The apparatus of claim 4, wherein the selecting comprises:
 enabling one of OLPC or CLPC in response to determining the mobility of the UE is in the second range lower than the first range and that the UE communicates with different one or more transmission points on the uplink than on the downlink.

6. The apparatus of claim 4, wherein the selecting comprises:
 enabling both CLPC and OLPC in response to determining the mobility of the UE is in the second range lower than the first range and that the UE communicates with different one or more transmission points on the UL than on the DL.

* * * * *